United States Patent [19]

McNally

[11] 3,812,997
[45] May 28, 1974

[54] COMBINATION SHIPPING AND COOKING CONTAINER

[76] Inventor: Violet M. McNally, 14 Fairway Dr., Old Bethpage, N.Y.

[22] Filed: Jan. 5, 1972

[21] Appl. No.: 215,531

[52] U.S. Cl.................. 220/22, 16/110 A, 16/115, 220/94 R
[51] Int. Cl...................... B65d 25/04, B65d 25/28
[58] Field of Search.................... 220/20, 22, 94 R; 16/110 R, 110 A, 113, 114 R, 120, 125, 115; 294/28, 29, 30, 31, 32, 33

[56] References Cited
UNITED STATES PATENTS

| | | | |
|---|---|---|---|
| 550,429 | 11/1895 | Weber | 16/113 |
| 993,163 | 5/1911 | Grilk | 16/126 |
| 1,290,186 | 1/1919 | Held | 220/22 |
| 2,016,488 | 10/1935 | Eckhaus | 220/22 |
| 2,364,073 | 12/1944 | Howard | 220/94 R |
| 2,903,127 | 9/1959 | Dorman | 220/22 |
| 3,187,933 | 6/1955 | Cheeley | 220/54 |
| 3,420,563 | 1/1969 | Witt | 294/33 |
| 3,610,461 | 10/1971 | Allyn | 220/94 R |

Primary Examiner—George E. Lowrance
Attorney, Agent, or Firm—Bauer & Amer

[57] ABSTRACT

A container or can for shipping food or the like which is also convertible into a suitable container for cooking the food, said container having a handle that is pivotal from a flush position adjacent the can into a position extending laterally thereof which facilitates handling and locating the can relative to a fire, stove, etc., as is necessary during cooking service of the can.

2 Claims, 10 Drawing Figures

PATENTED MAY 28 1974 3,812,997

COMBINATION SHIPPING AND COOKING CONTAINER

The present invention relates generally to a dual-purpose can or container, and more particularly to an improved container for shipping food and also subsequently cooking the food while still within said container.

The container hereof is particularly useful for campers and camping activities for college students, for use in small households, etc., since it obviates the need for separate cooking pots, vessels, and the like. The container for shipping or food-storage purposes, however, requires few structural features or componants, whereas such features as a gripping handle, cover and an internal compartment divider are helpful during cooking service of the container, and thus it is necessary that the container have these structural features so arranged thereon as to contribute to its being readily converted from one use to its other use. Prior art structures intended for similar pusposes are too complex and costly.

Broadly, it is an object of the present invention to provide an improved combination shipping and cooking container overcoming the foregoing and other shortcomings of the prior art. Specifically, it is an object to provide a container having a noteworthy handle thereon which has an out-of-the-way storage position adjacent the container and is movable therefrom into a position extending laterally of the container preparatory to cooking use thereof.

A container demonstrating objects and advantages of the present invention includes a handle formed of a pivotally mounted U-shaped spring member and a slide, said spring member, when being converted into said handle, being pivoted laterally of the can and the slide moved on said member so as to increase the length thereof. Sliding movement of the slide also releases the spring member for outward expansion into an engaged or locked position in which the otherwise pivotal handle can function as a rigid handle for the container.

The above brief description, as well as further objects, features, and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
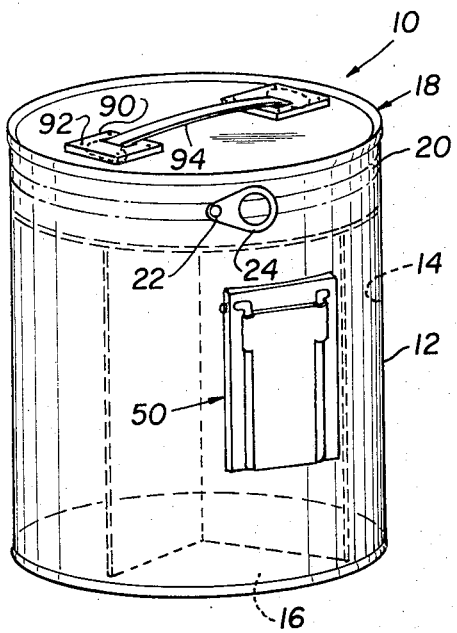
FIG. 1 is a perspective view of a dual-purpose container according to the present invention.
Figure 2:
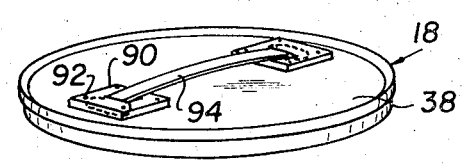
FIG. 2 is an exploded perspective view of the container illustrating structural details of the various components thereof.
Figure 2:
Figure 2:
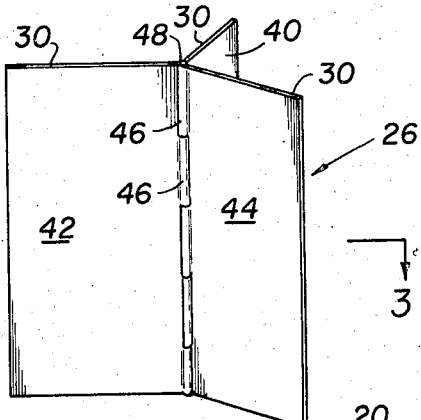
Figure 2:
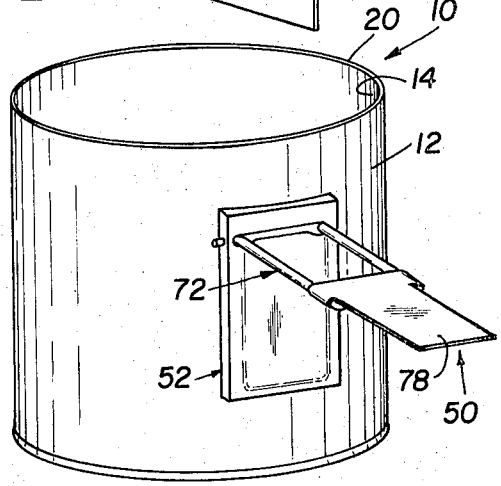
Figure 3:
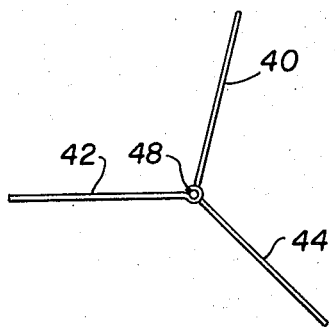
FIG. 3 is a plan view illustrating structural features of a compartment divider of the container.

Reference is now made to the drawings, and in particular to FIGS. 1–3, wherein there is shown a dual-purpose container, generally designated 10, demonstrating objects and advantages of the present invention. Specifically, one of the two purposes of the container 10 is for storage and shipping of food or other such contents, and to best serve this end container 10 has the structural features illustrated in FIG. 1. The other purpose of the container 10, as best illustrated in FIG. 2, is to facilitate the cooking of the food contents and to this end container 10 has the structural features and is otherwise convenient to use as a cooking vessel, pot or the like.

As illustrated in FIG. 1, container 10 includes a cylindrical body 12 bounding a corresponding cylindrical internal storage compartment 14, sealed at one end by a bottom closure 16 and at its other opposite end by a removable cover 18. Any appropriate technique facilitating the removal of the cover 18 may be utilized, as for example the well-known technique of delineating a removal strip 20 in the material out of which the body 12 is fabricated, which then has attached to it, as at 22, a pull tab 24. As generally understood, by pulling on the tab 24, strip 20 is readily removed from the body 12, thereby freeing the cover 18 fron its attachment to the body 12.

As illustrated in FIG. 2, the body 12 with its bottom closure 16 still intact, bounds the compartment 14 in which the food or other shipped contents of the container 10 may be conveniently cooked. To prevent any spilling of the food contents from the container 10 at the time of removal of the strip 12, or in other words to confine the volume of the food contents to the level of upper edge 20 which bounds the opening into the compartment 14, use is made of a food divider 26 to support the spacer member 28 beneath the removal top 18. That is, it will be understood that the height of the food divider 26 is of an extent such that the upper edges 30 thereof are just below the horizontal plane of the removable strip 20, all as is clearly illustrated in FIG. 1, and that supported on the edges 30 is the disk-like base 32 of spacer 28. Vertically oriented walls 34 and 36 span the distance from the edges 30 to the flat disk 38 of the top 18. Once strip 20 is removed to disconnect the top 18 from body 12 and, in the process, convert container 10 from a shipping container, as illustrated in FIG. 1, to a cooking container, as illustrated in FIG. 2, there is no longer any need for the spacing member 28, which may then be disposed of.

In accordance with a preferred embodiment of container 10, it is contemplated that different foods, as for example different vegetables, will be shipped in the container 10. It is thus one of the functions of the divider 26 to keep these different foods or vegetables separated from each other during subsequent cooking thereof when container 10 is in the form illustrated in FIG. 2. To the above end, the divider 26 includes three generally rectangular panels 40, 42 and 44, which are each formed at a confronting edge with hinge-like configurations, individually and collectively designated 46. A hinged pin 48 is inserted through the configurations 46 and thus hingedly connects the panels 40, 42 and 44 so that any selected circumferential orientation of these panels can be provided to in turn delineate any desired subcompartment between any two adjacent panels within the larger cylindrical compartment 14. As illustrated in FIG. 3, the hinge axis is coincident with the longitudinal center line of the cylindrical body 12.

A significant structural component of the container 10 which enables it to efficiently serve the dual function of a shipping and cooking container is an extensible handle, generally designated 50. An advantageous out-of-the-way storage position for the handle 50, in which it is adjacent the container 12, is illustrated in FIG. 1, whereas a laterally extending operative position of the handle 50, which facilitates moving the container 10 as is necessary, for example, in locating it over a stove or fire, is illustrated in FIG. 2.

Figures 4, 6A:
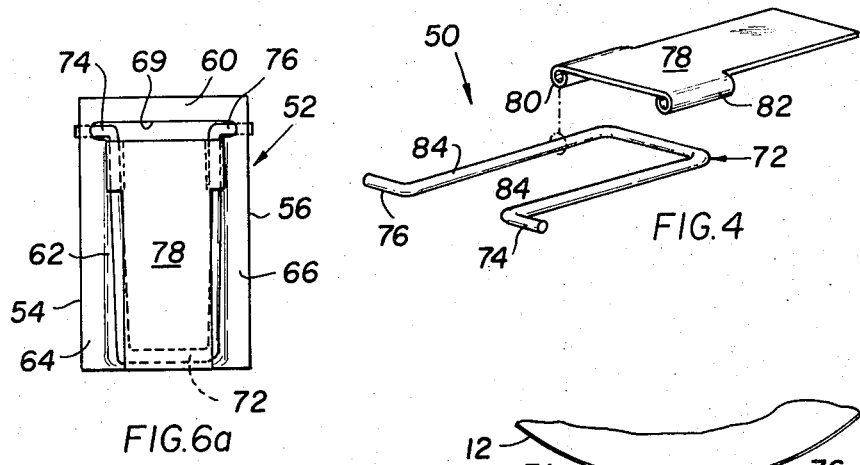
FIG. 4 is an isolated perspective view illustrating structural features of the extensible handle of the container.
FIG. 6a is an isolated front elevational view illustrating details of the storage position of the container handle.
Figure 6B:
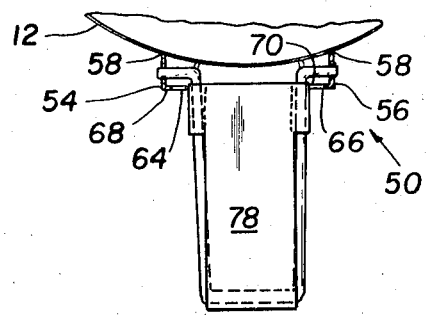
FIG. 6b is a plan view illustrating the handle in its laterally extending relation to the container and prior to its extension.

Referring now to the figures illustrating the structural details of the extensible handle 50, it will be noted, particularly from FIGS. 6a and 6b, that the same includes a housing 52 having opposite sides 54 and 56 which each are appropriately welded, as at edges 58, to the container 12. The front wall 50 of the housing 52, i.e. the wall between the sides 54 and 56, has a central depression 62 flanked on opposite sides by marginal portions 64 and 66, which each occupy a clearance position from the container wall 12. By progressive examination of FIGS. 6a and 6b, it will be noted that there is a lateral or horizontally oriented slot 69 in the wall 60 which forms support edges 68 and 70 in the marginal portions 64 and 66, respectively. The significance of the foregoing will subsequently be apparent. Cooperating with the housing 52 is a U-shaped spring member 72, the two bifurcated legs 84 of which each terminate in front sections 74 and 76. The assembly of member 72 within the housing 52 contemplates the projection of the sections 74 and 76 within the slot 69 and behind upper portions of the edge walls 64 and 66, the actual ends of the sections 74 and 76 being projected through pivot openings (not numbered) in the end walls 54 and 56. Thus, in the initial storage position of the spring member 72, as illustrated in FIG. 6a, said member 72 is located within the depression 62 and is free to be pivoted therefrom into a laterally extending position illustrated in FIG. 6b.

Figure 6C:
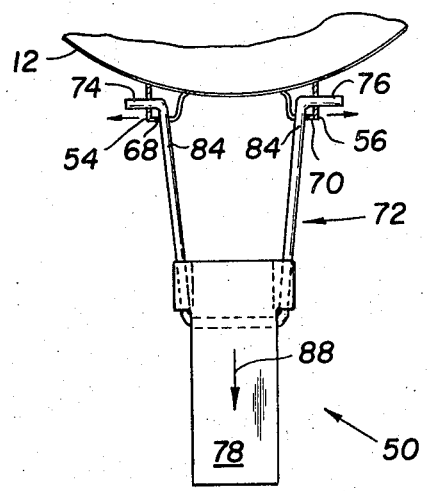
FIG. 6c, like FIG. 6b, is a plan view, but illustrating the handle in its fully extended condition.

Referring now to FIGS. 4 and 6c, it will be noted that the third component of the extensible handle 50 consists of a slide 78 having tube-like configurations 80 and 82 along opposite sides which slidably accommodate the bifurcated legs 84 of the member 72. In order of assembly, the two legs 84 of the member 72 are projected through the tubes 80 and 82 and then the sections 74 and 76 bent laterally of these legs.

In accordance with the present invention, not only does the slide 78 effectively serve to add to the length of members 72 to provide a comparatively large and convenient grip handle 50, but the slide 78 also confines member 72 to a width which is readily accommodated within the depression 62. However, when slide 78 is moved down the bifurcated legs 84 of member 72 to a position adjacent the cross piece thereof, member 72 spreads apart so that the bifurcated legs 84 thereof are outwardly diverging, all as is illustrated in FIG. 6c. As a consequence, the sections 74 and 76 project through the walls 54 and 56 and the portion of each leg 84 adjacent the sections 74 and 76 move over and thus into supporting contact onto the support edges 68 and 70. Thus container 10 can then be conveniently raised using the handle 50, since the contact of leg portions 84 with the support edges 68, 70 is effective to hold the container 10 against pivotal movement about the rotation axis of the bent sections 74 and 76.

Figures 5A, 5B, 5C:
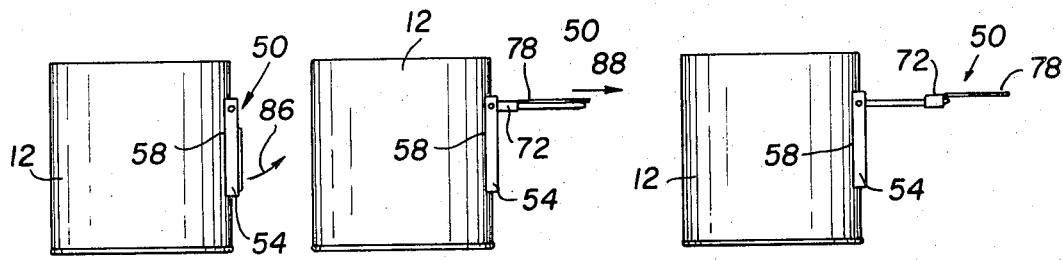
FIGS. 5a, 5b and 5c are side elevational views illustrating the manner in which said extensible handle of the container is moved from an out-of-the-way storage position into an operative position.

As diagramatically illustrated in FIGS. 5a, 5b and 5c, extensible handle 50 is thus readily pivoted through movement 86 from a convenient out-of-the-way storage position adjacent the container 12 into a position laterally extending therefrom. Next, slide 78 of handle 50 is conveniently moved through sliding movement 88 along spring member 72 which thus converts handle 50 into a more convenient size for gripping. In the fully extended position of handle 50, as illustrated in FIGS. 5c and 6c, the bifurcated legs 84 of member 72 expand widthwise and, as a consequence, moves into contact with support edges 68 and 70, this contact maintaining the relative positions of the handle 50 and the container 12 so that the container can be easily manipulated during cooking service using the handle 50.

To restore handle 50 to its storage position, it is necessary only to move slide 78 back along the bifurcated legs 84 of the member 72, which will result in the withdrawal of these legs from contact with the support edges 68 and 70. Member 72 is then readily pivoted down into the protective compartment or depression 62 of housing 52.

Further contributing to the use of container 10 as a cooking vessel is a handle for the cover 18. This handle includes spaced, rectangular holders 90 welded, as at 92, to the cover body 38 which can confine an enlarged end of a strap-like handle 94. During shipping, the handle strip 94 lies flush against the cover body 38, and during cooking service of container 12 it readily serves as a hand grip for lifting and handling the cover 18.

A latitude of modification, change and substitution is intended in the foregoing disclosure, and in some instances some features of the invention will be employed without a corresponding use of other features. For example, the tear strip 20 can be raised to a position adjacent the cover disc 38 and thereby eliminate the depending lip on the embodiment of cover 18 illustrated herein. Accordingly, it is appropriate that the appended claims be construed broadly and in a manner consistent with the spirit and scope of the invention herein.

What is claimed is:

1. A combined shipping and cooking container having a side wall and bottom defining a storage compartment,
   a top closing said container and being removable therefrom,
   said top including a cover peripherally attached to a depending side wall forming an integral connection with said container side wall,
   a tear strip between said container and top side walls defining a portion of said side walls to integrally connect the same together and removable from said side walls to disconnect the same from each other and enable said top to be removed from said container,
   a handle on said top to facilitate manipulation thereof to open and close said storage compartment,
   a divider having a plurality of panels in said storage compartment to divide the same into a plurality of separate storage compartments, said divider extending from the bottom of said storage compartment upward toward said tear strip, spacing disc means engaging said divider at the top thereof to close the top of said divider and effectively to close said plurality of storage compartments and vertical walls extending upward from said disc into vertical engagement with said removable top when the same is still peripherally attached to said container side wall to span the space therebetween and being removable when said tear strip is removed, a telescopic handle on said container pivotable relative thereto and extensible therefrom to enable the manipulation of said container before and after the tear strip is removed.

2. A combined shipping and cooking container as in claim 1, said handle including a substantially U-shaped spring member pivotally connected at the free ends thereof to said container to move between active and inactive handle positions and a telescoping slide on said spring, said slide being movable along the length of the legs of said U-shaped member and overlying and being supported on the base of said U-shape connecting said legs together to move telescopically relative to said pivotal connection to increase the length of the handle when the same is in its active position and to decrease the effective usable length of said handle when the same is in its inactive position.

* * * * *